United States Patent [19]

Kos

[11] Patent Number: 5,243,964
[45] Date of Patent: Sep. 14, 1993

[54] PLASTIC VESSEL AND METHOD OF ASSEMBLY THEREOF

[75] Inventor: Chester M. Kos, Cross Junction, Va.

[73] Assignee: Rubbermaid Commercial Products Inc., Winchester, Va.

[21] Appl. No.: 671,436

[22] Filed: Mar. 19, 1991

[51] Int. Cl.⁵ .............................................. A47J 22/00
[52] U.S. Cl. ..................... 126/390; 126/373; 264/249; 206/524.6; 220/681; 220/DIG. 14
[58] Field of Search .................. 126/373, 390; 99/279; 215/1 C; 206/524.6; 428/34.1, 35.7; 220/577, DIG. 14, 912, 681; 222/475, 475.1

[56] References Cited

U.S. PATENT DOCUMENTS

| | | | |
|---|---|---|---|
| 3,145,708 | 8/1964 | Fisher | 126/390 |
| 3,727,782 | 4/1973 | Doughty | 215/1 C |
| 3,971,361 | 7/1976 | Hurko | 126/390 |
| 4,422,442 | 12/1983 | Gutmann et al. | 126/390 |
| 4,629,866 | 12/1986 | Proctor | 219/439 |
| 4,715,269 | 12/1987 | Stoner | 99/279 |
| 4,825,757 | 5/1989 | Stoner | 99/279 |
| 4,860,906 | 8/1989 | Pellegrini et al. | 215/12.2 |
| 4,879,146 | 11/1989 | Johnston | 428/35.7 |
| 5,025,939 | 6/1991 | Bunn et al. | 222/475.1 X |

FOREIGN PATENT DOCUMENTS 2218897  11/1989  United Kingdom ............ 222/475.1

OTHER PUBLICATIONS

A Bloomfield Koffee King Advertising sheet, date unknown.
Cecilware Advertisement, OCS Innovations '89.
Gemco Advertisement for Gemex, Gemco-Ware, Inc., One Gemco Plaza, Freeport, N.Y., date unknown.
General Electric Market Overview, May, 1988.

Primary Examiner—Carl D. Price
Attorney, Agent, or Firm—Renner, Kenner, Greive, Bobak, Taylor & Weber

[57] ABSTRACT

A plastic vessel (10) for containing a hot liquid and having the capability of being placed on a hot plate, burner or the like to maintain the liquid hot includes a top portion (11) molded of a first heat resistant plastic material. A base portion (13) molded of a second plastic material being more heat resistant than the first plastic material is attached to the top portion (11) to close the same and form the container for the hot liquid. One form of attachment of the base portion (13) to the top portion (11) is the utilization of a gasket (12) preferably formulated of a mixture of the first and second plastic materials which is heated to fuse the top portion (11) to the base portion (13). A heat shield (14, 40), formed of a third plastic material which is more heat resistant than the first and second plastic materials and which can withstand the heat of direct contact with the hot plate, is attached to the bottom of the base portion (13). One form of such attachment is a heat stake (32) which depends from the bottom of the base portion (13) and extends through an aperture (33) in the heat shield (14, 40) for attachment by a staking process.

30 Claims, 4 Drawing Sheets

PLASTIC VESSEL AND METHOD OF ASSEMBLY THEREOF

TECHNICAL FIELD

This invention relates to a plastic vessel for holding coffee or the like and its method of assembly. More particularly, this invention relates to a vessel which is entirely made of plastic but which can be economically manufactured and placed directly on a burner to maintain the contents thereof warm.

BACKGROUND ART

Most vessels for containing coffee or other hot liquids are made out of a rather specialized glass and are therefore somewhat expensive and easily broken. The improper use and breakage of such vessels or coffee pots can often cause bodily injury. In fact, many glass pots have warnings printed directly thereon to alert the user as to how to avoid breakage or scratching of the pot and bodily injury to the user.

Making coffee pots out of a material less susceptible to breakage, such as plastic, would seem to be a reasonable response to the problems encountered with prior art glass coffee pots. While all-plastic decanters or carafes exist which can contain coffee or other hot liquids for serving, such cannot be placed on a burner or hot plate to maintain the coffee hot between servings without melting the plastic. Moreover, while sophisticated plastics are available which can withstand the temperatures generated by burners or hot plates, the same are quite expensive and a coffee pot molded entirely of these materials would be cost prohibitive.

One proposed solution has been to provide a coffee pot molded of an inexpensive, non-heat resistant plastic and attach a base made, for example, from stainless steel to the bottom thereof. However, not only does such construction require the use of mechanical or adhesive fasteners, but also the stainless steel base adds significantly to the weight and the cost of the product. Moreover, such fastening requirements have proved unreliable and present complications when cleaning the coffee pots.

Thus, a need persists to provide an economically manufactured all-plastic vessel which will withstand the heat of a burner or the like.

DISCLOSURE OF THE INVENTION

It is thus a primary object of the present invention to provide an economically manufactured all-plastic vessel, such as a coffee pot, and its method of assembly.

It is another object of the present invention to provide an all-plastic vessel, as above, which can be placed directly on a burner or hot plate to maintain the contents thereof warm.

It is an additional object of the present invention to provide an all-plastic vessel, as above, in which one type of plastic forms the majority of the vessel and another type of plastic, more heat resistant than the first, forms the base of the vessel.

It is yet another object of the present invention to provide an all-plastic vessel, as above, in which a third type of heat resistant plastic is attached to the base of the vessel to provide a heat shield.

It is a further object of the present invention to provide an all-plastic vessel, as above, which is assembled without the use of mechanical fasteners, adhesives or the like.

These and other objects of the present invention, as well as the advantages thereof over existing prior art forms, which will become apparent from the description to follow, are accomplished by the improvements hereinafter described and claimed.

In general, a plastic vessel for containing a hot liquid, such as coffee, and for maintaining the liquid warm by having the capability of being placed on a hot plate or burner includes a top portion and a base portion. The base portion encloses the bottom of the top portion so that the base portion and top portion define a vessel for the liquid. A heat shield is attached to the base portion to protect the base portion and the top portion from the direct heat of the hot plate upon which the vessel may be placed.

A preferred exemplary all-plastic vessel, and its method of assembly, incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
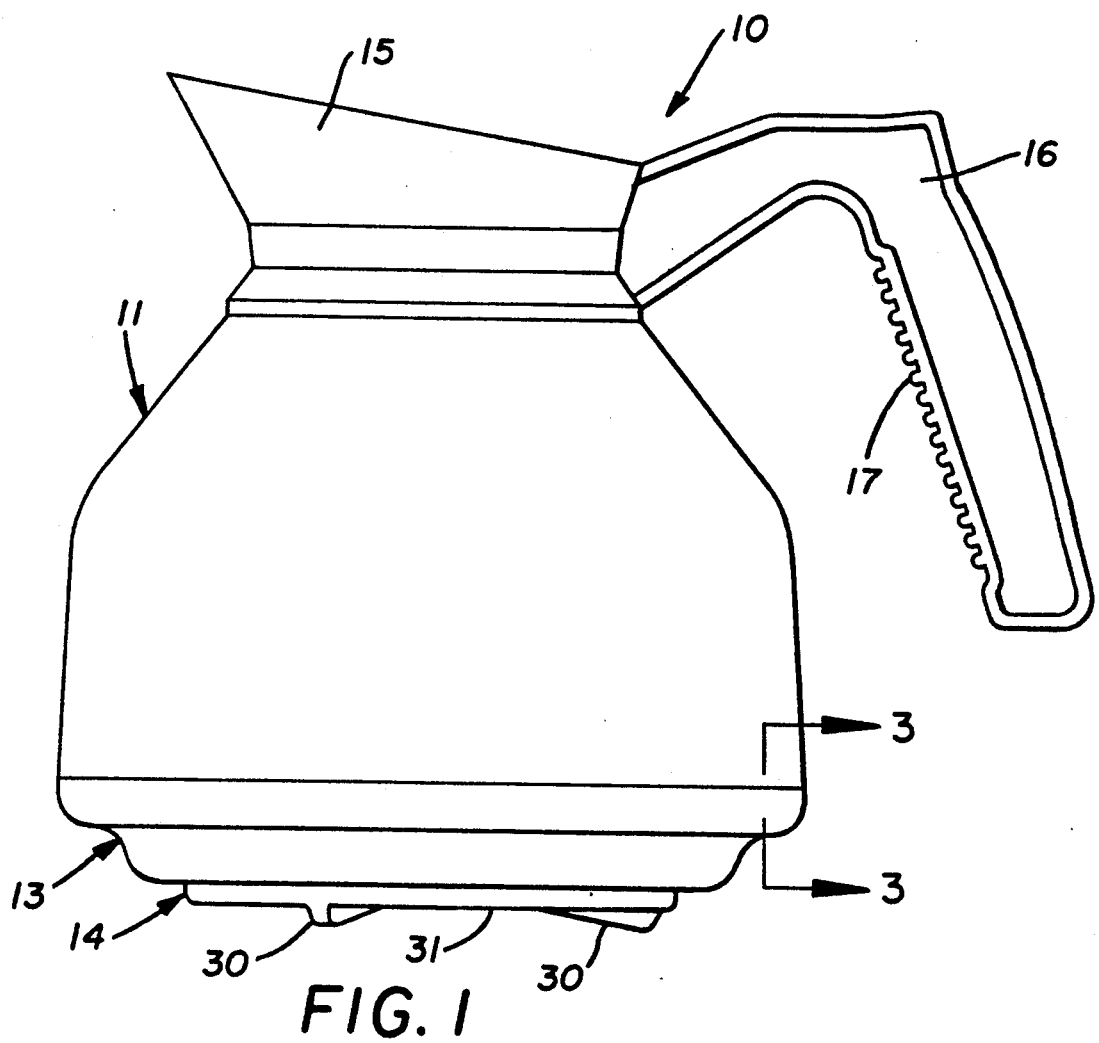
FIG. 1 is an elevational view of a vessel made in accordance with the concepts of the present invention.
Figure 2:
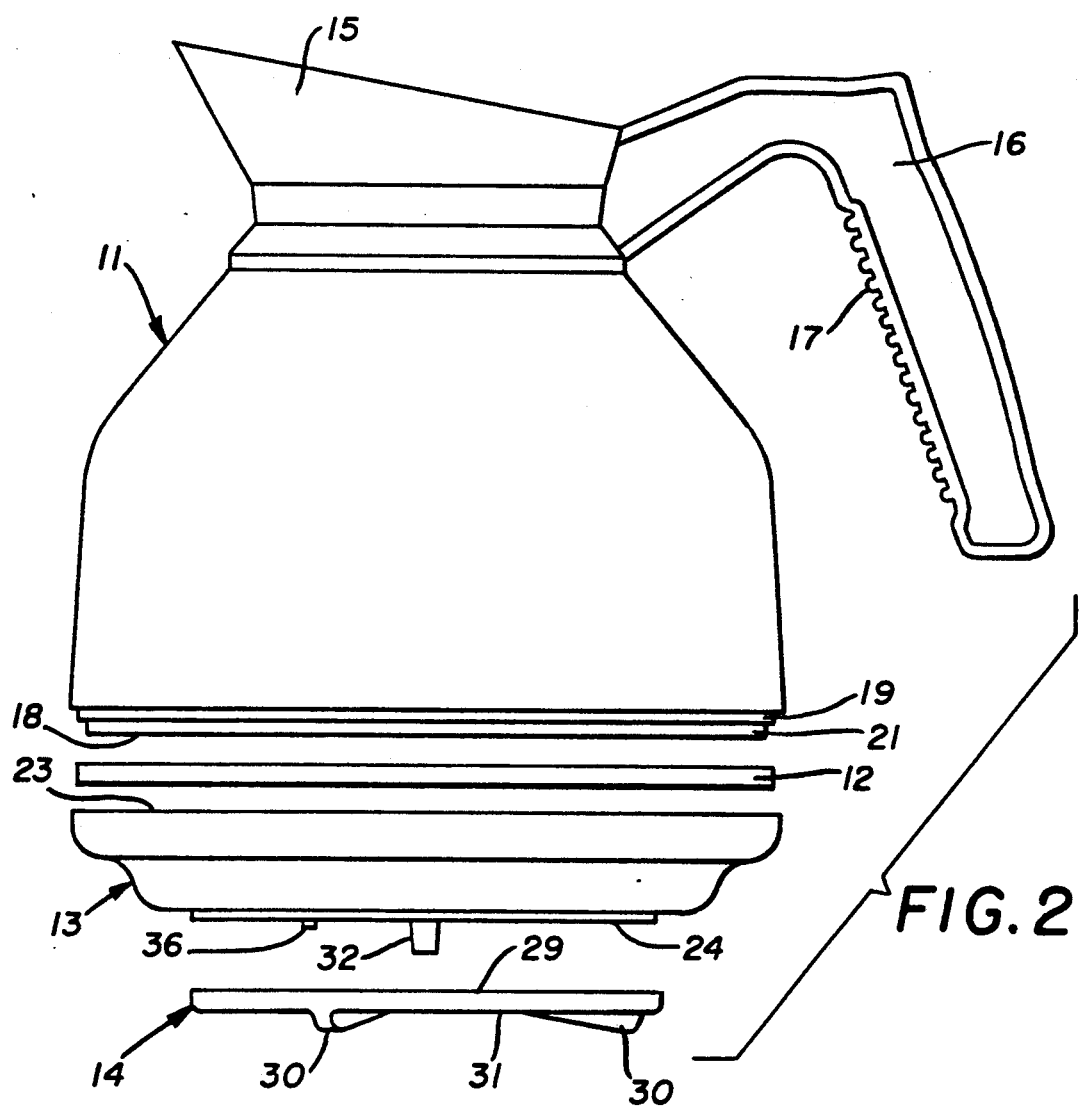
FIG. 2 is an exploded disassembled elevational view of the vessel of FIG. 1.

A plastic vessel according to the concept of the present invention is indicated generally by the numeral 10 in FIG. 1 and shown in the form of a coffee pot; however, it should be appreciated that the vessel of the present invention can be utilized to contain any fluid and has the ability to be placed directly onto a burner or hot plate to maintain the fluid hot, as desired. Coffee pot 10 is shown in FIG. 2 as including a top container portion, indicated generally by the numeral 11; a sealing gasket 12; a base portion, indicated generally by the numeral 13; and a heat shield portion, indicated generally by the numeral 14.

Top container portion 11 of coffee pot 10 is molded in one piece of a high temperature resistant, inexpensive, and preferably transparent plastic. Generally plastics that are stable at temperatures of up to about 200° F. to 300° F., such as polysulfone, polycarbonate or the like can be employed. Top container portion 11, of course, has an open top which is formed as a pouring spout 15 so that coffee or any liquid contained in pot 10 may be conveniently dispensed therefrom. A handle 16 is molded into top portion 11 on the side thereof opposite to that which the liquid is to be dispensed through spout 15. Handle 16 can be provided with serrations 17 to assist the user in gripping the same.

Figures 3, 3A:
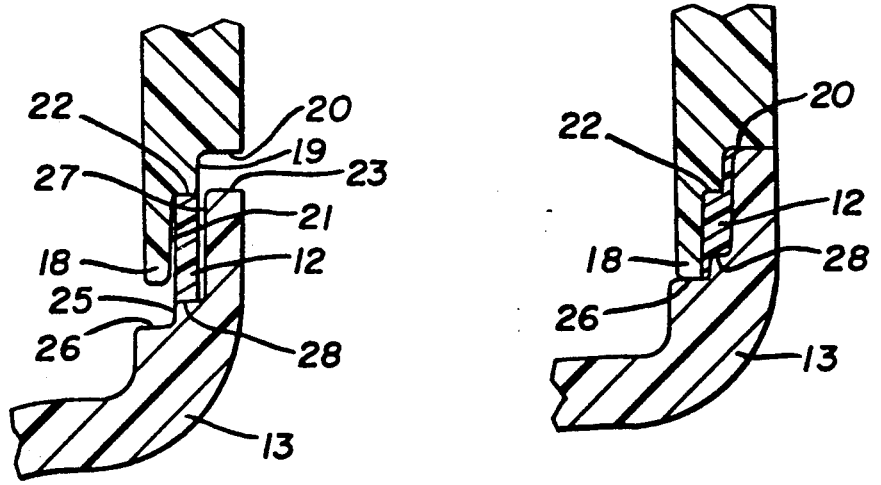
FIG. 3 is a partial sectional view taken substantially along line 3—3 of FIG. 1.
FIG. 3A is a partial sectional view similar to FIG. 3 but showing the configuration of the components prior to assembly.

Prior to its assembly with base portion 13, the bottom 18 of container portion 11 is open and, as best shown in FIGS. 3 and 3A, the external periphery of the bottom 18 of container portion 11 is provided with a first circumferential step 19 forming a shoulder 20 and a second circumferential step 21 forming a shoulder 22.

Base portion 13 is also molded of a heat resistant plastic, such as polyethersulfone, polyarylsulfone, polyetherimide or a like plastic which is somewhat more heat resistant than the plastic from which top container portion 11 is formed. Suitable plastics for base portion 13 should be stable at temperatures of up to about 350° F. to 450° F. Base portion 13 includes an open top 23, for mating engagement with the open bottom 18 of container portion 11, and a closed bottom 24. As best shown in FIGS. 3 and 3A, the inner periphery of top 23 of base portion 13 is provided with a first circumferential step 25 forming a shoulder 26 and a second circumferential step 27 forming a shoulder 28. While the outer diameters of container portion 11 and base portion 13 are identical, the diameter of step 27 of base portion 13 is slightly larger than the diameter of step 19 of container portion 11. Similarly, the diameter of step 25 of base portion 13 is slightly larger than the diameter of step 21 of container portion 11.

Container portion 11 is attached to base portion 13 without the need for mechanical or adhesive fasteners by means of a specially formulated gasket 12. Gasket 12 is formed of at least one of the materials used to form container portion 11 or base portion 13 and is preferably formed of a mixture of both materials. In addition, gasket 12 contains a filler material such as stainless steel filings. Thus, if container portion 11 is formed of polysulfone and if base portion 13 is formed of polyethersulfone, gasket 12 would be composed of at least one of these resins and approximately ten percent of the stainless steel filler. If, as preferable, gasket 12 were compounded of polysulfone, polyethersulfone and the stainless steel filler, approximately equal parts of polysulfone resin and polyethersulfone resin, along with approximately ten percent of the stainless steel filler, would be provided.

The manner in which gasket 12 hermetically seals the joint between container portion 11 and base portion 13 is shown in FIGS. 3 and 3A. As shown in FIG. 3A, gasket 12 is positioned between step 21 of container portion 11 and step 27 of base portion 13 so that its upper and lower edges abut shoulders 22 and 28, respectively. As gasket 12 is heated, container portion 11 and base portion 13 are mechanically pressed together. As such, the top edge 23 of base portion 13 abuts shoulder 20 of container portion 11 and the lower edge 18 of container portion 11 abuts shoulder 26 of base portion 13. The heated gasket 12 then deforms to fill the voids between step 27 of base portion 13 and steps 19 and 21 of container portion 11 as well as the voids between step 21 and step 25 of base portion 13, as shown in FIG. 3. Upon cooling, container portion 11 and base portion 13 are thus hermetically and chemically fused together as one integral liquid-containing component.

Heat shield 14 is constructed of a high heat resistant plastic, such as a thermosetting polyester or the like, which is more heat resistant than the material used to form base portion 13 and top container portion 11. Preferably, the plastic for heat shield 14 is of the type which will remain stable at temperatures of up to about 500° F. to 800° F. Heat shield 14 is shown as having a relatively planar top surface 29 adapted to support base portion 13 and a plurality of feet 30 depending from and extending generally radially inward from the outer periphery of the bottom surface 31 thereof. It is intended that only the reduced surface area of feet 30 would be in contact with the hot plate or burner upon which coffee pot 10 may rest thereby leaving an air gap between the hot plate and bottom surface 31. The material of heat shield 14 can withstand the direct contact with the burner and yet transmit sufficient heat through feet 30 to base portion 13 and container portion 11 to maintain the contents of pot 10 warm, but insufficient heat to damage base portion 13 and container portion 11 which are constructed of materials which could not withstand direct burner contact.

Despite the heat resistive nature of heat shield 14, it is preferable that feet 30 do not contact any hot spots found in typical hot plates or burners. Most conventional hot plates have such hot spots at the same general circumferential location. For example, for explanation purposes, assuming a hot plate to resemble the face of a clock with the user standing at six o'clock, the hot spots are usually found at the seven to eight o'clock area and the four to five o'clock area. Stated another way, these hot spots are approximately forty-five degrees from the circumferential point closest to the user. As probably best shown in FIG. 4, so that the user will most often avoid placing any of the feet 30 on these hot spots, one foot 30 is preferably aligned directly under handle 16 so that as the user places the coffee pot 10 on the hot plate, the foot 30 under the handle will most often be between the hot spots. The other two feet 30 are preferably evenly spaced around bottom surface 31, that is, one-hundred twenty degrees of each other, and are thus clearly spaced from the typical hot spots. Moreover, the generally radial extending nature of feet 30 assists in assuring that the foot 30 under handle 16 avoids the hot spots.

Figure 5A:
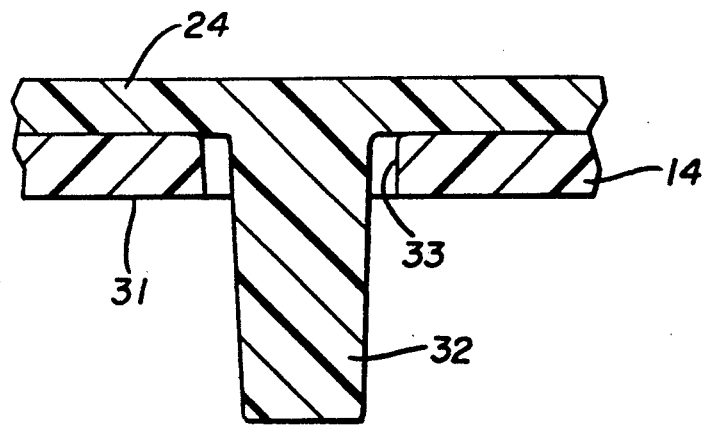
FIG. 5A is a partial sectional view similar to FIG. 5 but showing the configuration of the components prior to assembly.
Figure 5:
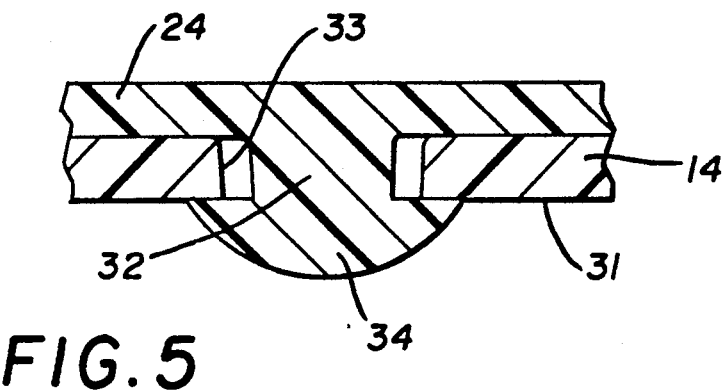
FIG. 5 is a partial sectional view taken substantially along line 5—5 of FIG. 4.

One manner in which base portion 13 may be attached to heat shield 14 is shown in FIGS. 5 and 5A. Bottom 24 of base portion 13 is provided with at least one stake 32 depending therefrom. Heat shield 14 is provided with an aperture 33 therein which is aligned with stake 32. During a conventional staking operation, such as sonic, heat, or mechanical staking procedures, stake 32 is deformed, as to configuration 34 shown in FIG. 5, to engage bottom surface 31 of heat shield 14 upon cooling. The exact shape of configuration 34 may vary dependent upon the staking tool utilized to perform the conventional staking process. Moreover, the number of staking members 32 may vary from the one shown to any number which could be economically justified to obtain the degree of positive lock required. In any event, by utilizing the staking operation, the connection between base portion 13 and heat shield 14 is accomplished without the need for secondary fasteners or adhesives. It should also be appreciated that instead of utilizing a staking procedure to attach heat shield 14 to base portion 13, other procedures could be utilized without departing from the spirit of this invention. For example, a gasket attachment arrangement similar to the manner in which container portion 11 is attached to base portion 13 could be provided. Moreover, the parts could be joined by a conventional insert molding process or could even be threadably engaged.

Figure 7:
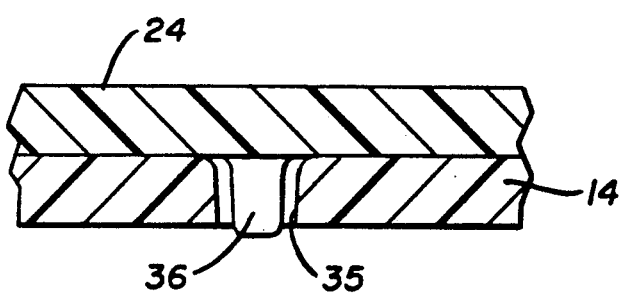
FIG. 7 is a partial sectional view taken substantially along line 7—7 of FIG. 4.
Figure 4:
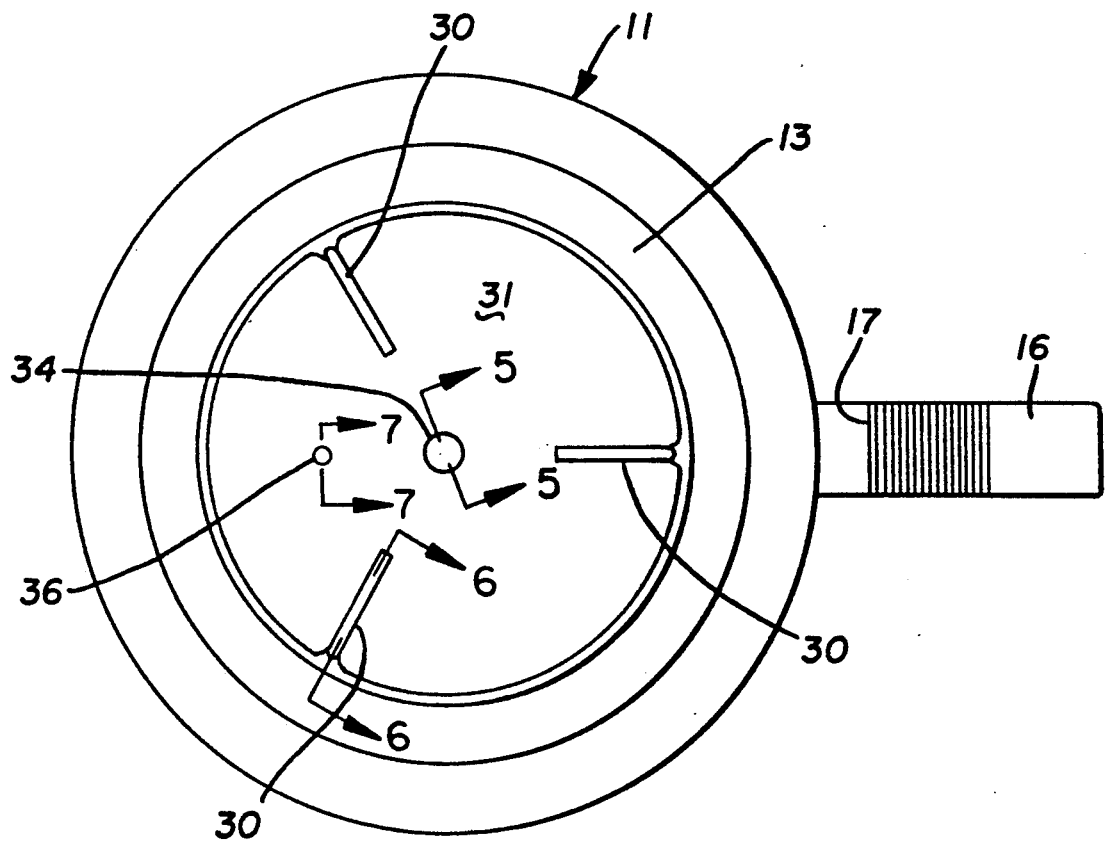
FIG. 4 is a bottom plan view of the vessel shown in FIG. 1.

In the embodiment shown, only one stake 32 is provided, being located generally centrally of bottom 31 of heat shield 14 (FIG. 4). As such, with only one stake 32 being employed, it is possible that heat shield 14 could be rotated with respect to base portion 13. To prevent this from occurring, as best shown in FIG. 7, an aperture 35 may be provided at any location in heat shield 14 to receive a pin 36 depending from a corresponding location of the bottom 24 of base portion 13. Thus, any tendency for the members to rotate about stake 32 is avoided.

Figure 6:
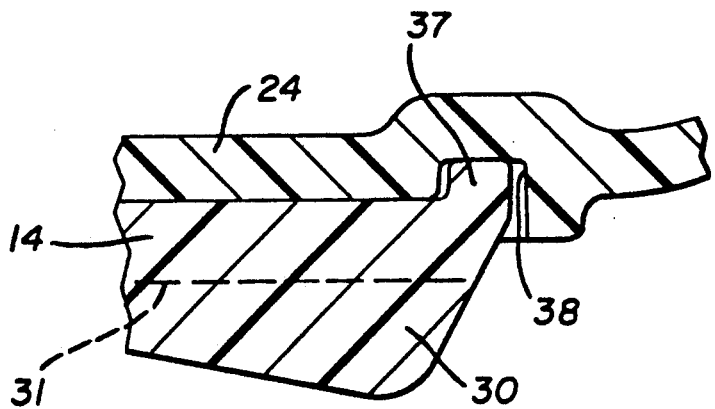
FIG. 6 is a partial sectional view taken substantially along line 6—6 of FIG. 4.

Were both the bottom 24 of base portion 13 and the top surface 29 of heat shield 14 absolutely planar, there might be a tendency for moisture to accumulate between base portion 13 and heat shield 14 which could promote the separation of the two elements. To alleviate this possibility, as best shown in FIG. 6, the periphery of top surface 29 of heat shield 14 can be provided with an upstanding circumferential lug 37 adapted to be received within or otherwise engage a circumferential recess 38 provided near the periphery of bottom 24 of base portion 13. As such, when base portion 13 is affixed to heat shield 14 by the staking operation or any other process previously described, a positive interference fit is created as lug 37 is pressed tightly within recess 38. Should any moisture still manage to find its way between base portion 13 and heat shield 14, aperture 35 in heat shield 14 will serve as a vent hole. Thus, when heated, any such moisture will turn to steam and be released through aperture 35.

Figure 8:
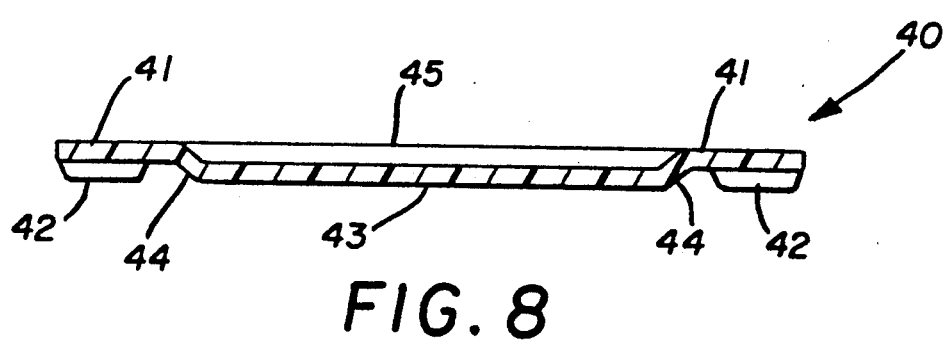
FIG. 8 is a cross section of an alternative embodiment for the heat shield of the vessel of FIG. 1.

An alternative form for the heat shield is shown in FIG. 8 and indicated generally by the numeral 40. As opposed to heat shield 14, heat shield 40 is more dishlike in configuration with its uppermost generally planar surface 41 being located at the periphery thereof to support base portion 13. While a plurality of feet 42 similar to feet 30 of heat shield 14 depend from the peripheral surface 41, in this embodiment it is not intended that feet 42 engage the hot plate or burner. Rather, feet 42 straddle the burner which is engaged by the central generally planar bottom surface 43 integrally formed with peripheral surface 41 via a circumferential angled surface 44. Heat shield 40 may be attached to base portion 13 as by the staking procedure described with respect to heat shield 14, one or more stakes being received along peripheral surface 41, or it may be integrally formed with base portion 13 by an insert molding process well known to one of ordinary skill in the art. Moreover, heat shield 40 may be affixed to base portion 13 via the gasket system previously described.

Heat shield 40, like heat shield 14, is made of a high temperature polymer, such as a thermoplastic polyester or the like. However, because a larger surface of heat shield 40, that is, the central bottom surface 43, is engaging the hot plate rather than the smaller surface of heat shield 14, that is, feet 30 which engage the hot plate, the dimensions of heat shield 40 are somewhat more critical to prevent damage to the less heat resistant base portion 13 and container portion 11. In this regard, for standard coffee pots which hold approximately twelve cups of coffee, the outer diameter of heat shield 40 is in the range of approximately 3.5 inches to approximately 5.0 inches and preferably about 4.25 inches. The diameter of bottom surface 43 forms a reduced surface area and is preferably approximately two inches and at least in the range of 1.5 inches to 2.5 inches. The total height of heat shield 40 should be in a range of 0.1 inches to 0.5 inches, preferably about 0.25 inches, with the thickness of surfaces 41, 43 and 44 being in the range of 0.05 inches to 0.15 inches, preferably about 0.1 inches. As such, a small air gap 45 is provided between bottom surface 43 and the bottom 24 of base portion 13 to prevent the possible damage thereto which might occur if bottom 24 were in direct contact with surface 43.

It should thus be appreciated that a vessel constructed according to the concept of the present invention, as just described, accomplishes the objects of the present invention and otherwise substantially improves the art.

I claim:

1. A plastic vessel for containing a hot liquid and being adapted to be placed on a hot plate or the like to maintain the liquid hot comprising a top portion, a base portion, said base portion enclosing the bottom of said top portion so that together said top portion and said base portion can hold the hot liquid, a heat shield to protect said base portion and said top portion from direct heat from the hot plate, means to permanently attach said heat shield to said base portion, and means to prevent rotation of said base portion with respect to said heat shield, said means to attach including at least one stake depending from the bottom of said base portion, and an aperture in said heat shield to receive said stake therethrough, said stake being deformed to engage said heat shield.

2. A plastic vessel according to claim 1 wherein said means to prevent rotation includes a pin depending from the bottom of said base portion and an aperture in said heat shield to receive said pin.

3. A plastic vessel according to claim 1 further comprising means to prevent the presence of moisture between said heat shield and said base portion.

4. A plastic vessel according to claim 1 wherein said heat shield has a generally planar surface and a plurality of feet extending downwardly from said surface and adapted to rest on the hot plate thereby forming a gap between said surface and the hot plate.

5. A plastic vessel for containing a hot liquid and being adapted to be placed on a hot plate or the like to maintain the liquid hot comprising a top portion, a base portion, said base portion enclosing the bottom of said top portion so that together said top portion and said base portion can hold the hot liquid, a heat shield to protect said base portion and said top portion from direct heat from the hot plate, means to attach said heat shield to said base portion, and means to prevent the presence of moisture between said heat shield and said base portion, said means to prevent including a recess around the periphery of the bottom of said base portion and a lug extending upwardly from the periphery of said heat shield and received in said recess.

6. A plastic vessel according to claim 5 wherein said means to prevent further includes vent means in said heat shield to expel any moisture between said heat shield and said base portion.

7. A plastic vessel for containing a hot liquid and being adapted to be placed on a hot plate or the like to maintain the liquid hot comprising a top portion, a base portion, said base portion enclosing the bottom of said top portion so that together said top portion and said base portion can hold the hot liquid, a heat shield to protect said base portion and said top portion from direct heat from the hot plate, said heat shield having a generally planar bottom surface adapted to rest on the hot plate, a circumferential angled surface extending from its lower end upwardly from the periphery of said bottom surface to its upper end, a generally planar circumferential surface at the upper end of said angled surface, and a plurality of feet extending downwardly from said circumferential surface thereby forming an air gap between said bottom surface and said base portion, and means to attach said heat shield to said base portion.

8. A plastic vessel according to claim 1 wherein said top portion and said base portion are initially separate members and further comprising means to fuse said top portion to said base portion.

9. A plastic vessel according to claim 8 wherein said means to fuse includes a gasket interposed between said top portion and said base portion which, upon heating, fuses said top portion to said base portion.

10. A plastic vessel for containing a hot liquid and being adapted to be placed on a hot plate or the like to maintain the liquid hot comprising a top portion formed of a first plastic material, a base portion formed of a second plastic material, said top portion and said base portion being initially separate members and including a gasket formed of a compound including both said first and second plastic materials interposed between said top portion and said base portion which, upon heating, fuses the bottom of said top portion to said base portion so that together said top portion and said base portion can hold the hot liquid, a heat shield to protect said base portion and said top portion from direct heat from the hot plate, and means to attach said heat shield to said base portion.

11. A plastic vessel according to claim 10 wherein said top portion has a shoulder formed therein and said base portion has a shoulder formed therein, said gasket being interposed between said shoulders.

12. A plastic vessel according to claim 11 wherein said top portion has a second shoulder formed therein and said base portion has a second shoulder formed therein, said base portion having an uppermost portion engaging said second shoulder of said top portion and said top portion having a lowermost portion engaging said second shoulder of said base portion.

13. A plastic vessel for containing a hot liquid and being adapted to be placed on a hot plate or the like to maintain the liquid hot comprising a top portion made of a first heat resistant plastic material, a base portion made of a second plastic material more heat resistant than said first heat resistant plastic material, said base portion enclosing the bottom of said top portion so that together said top portion and said base portion can hold the hot liquid, a heat shield to protect said base portion and said top portion from direct heat from the hot plate and made of a third plastic material more heat resistant than said second plastic material, and means to attach said heat shield to said base portion.

14. A plastic vessel according to claim 13 further comprising gasket means to fuse said top portion to said base portion, said gasket means being formed of both said first heat resistant plastic material and said second plastic material.

15. A plastic vessel according to claim 13 wherein said first heat resistant plastic material is polysulfone, said second plastic material is polyethersulfone, and said third plastic material is a thermosetting polyester.

16. A method of making a vessel for containing a hot liquid, the vessel being adapted to be placed on a hot plate or the like to maintain the liquid hot comprising the steps of molding a plastic top portion of the vessel, molding a plastic base portion of the vessel, molding a plastic heat shield adapted to contact the hot plate, attaching the base portion to the bottom of the top portion thereby forming a container for the liquid, attaching the heat shield to the bottom of the base portion by staking the base portion to the heat shield, and preventing rotation of the heat shield with respect to the base portion.

17. A method according to claim 16 wherein the step of attaching the base portion to the bottom of the top portion includes the step of interposing a gasket between the top portion and the base portion.

18. A method according to claim 17 wherein the step of attaching the base portion to the bottom of the top portion includes the step of heating the gasket while pressing the top portion and the base portion together thereby fusing the tip portion to the base portion upon cooling of the gasket.

19. A method of making a vessel for containing a hot liquid, the vessel being adapted to be placed on a hot plate or the like to maintain the liquid hot comprising the steps of molding a plastic top portion of the vessel, molding a plastic base portion of the vessel, molding a plastic heat shield adapted to contact the hot plate, attaching the base portion to the bottom of the top portion thereby forming a container for the liquid, attaching the heat shield to the bottom of the base portion and sealing the junction between the heat shield and the base portion to prevent moisture from seeping therebetween.

20. A method of making a vessel for containing a hot liquid, the vessel being adapted to be placed on a hot plate or the like to maintain the liquid hot comprising the steps of molding a top portion of the vessel made of a heat resistant plastic material, molding a base portion of the vessel made of a second plastic material more heat resistant than the plastic material of the top portion, molding a heat shield adapted to contact the hot plate and made of a third plastic material more heat resistant than the second plastic material, attaching the base portion to the bottom of the top portion thereby forming a container for the liquid, and attaching the heat shield to the bottom of the base portion.

21. A method according to claim 20 wherein the step of attaching the base portion to the bottom of the top portion includes the step of interposing a gasket containing both the heat resistant plastic material and the second plastic material between the top portion and the base portion.

22. A method according to claim 20 wherein the step of attaching the heat shield to the bottom of the base portion includes the step of interposing a gasket containing both the second plastic material and the third plastic material between the base portion and the heat shield.

23. A heatable liquid containing vessel for use upon an underlying heating element, the vessel comprising at least two contacting plastic components composed of materials having differing heat resistivity, with the plastic component that is placed in contact with the heating element having a heat resistivity sufficient to withstand temperatures of up to 800° F. which may result from direct contact with the heating element, and means to attach said plastic components together, said means to attach including at least one stake element.

24. A heatable liquid containing vessel according to claim 23 wherein said means to attach further includes a gasket interposed between said plastic components.

25. A heatable liquid containing vessel according to claim 23 wherein said plastic component that is placed in contact with the heating element includes bottom means of a reduced surface area positionable adjacent to selective portions of the underlying heating element thereby controllably conducting heat therethrough to the liquid in the vessel.

26. A heatable liquid containing vessel according to claim 25 wherein said bottom means includes a generally planar surface adapted to rest on a selected location of the heating element.

27. A heatable liquid containing vessel according to claim 23 wherein said plastic component that is placed in contact with the heating element is composed of a thermoset plastic material.

28. A heatable liquid containing vessel according to claim 23 wherein the plastic component that is not in contact with the heating element is composed of a thermoplastic material.

29. A heatable liquid containing vessel for use upon an underlying heating element, the vessel comprising at least two contacting plastic components composed of materials have differing heat resistivity, with the plastic component that is placed in contact with the heating element having a heat resistivity sufficient to withstand temperatures of up to 800° F. which may result from direct contact with the heating element and including bottom means of a reduced surface area positionable adjacent to selective portions of the underlying heating element thereby controllably conducting heat therethrough to the liquid in the vessel, said bottom means having a plurality of feet adapted to rest on selected locations of the heating element.

30. A heatable liquid containing vessel according to claim 29 further comprising a handle member extending outwardly from the plastic component that is not in contact with the heating element, said handle member being aligned with one of said feet.

* * * * *